(12) United States Patent
Theis

(10) Patent No.: US 8,714,203 B2
(45) Date of Patent: May 6, 2014

(54) HYBRID HIGH PRESSURE HOSE

(75) Inventor: Jeffrey D. Theis, Dubuque, IA (US)

(73) Assignee: Schieffer Co. International L.C., Peosta, IA (US)

( * ) Notice: Subject to any disclaimer, the term of this patent is extended or adjusted under 35 U.S.C. 154(b) by 802 days.

(21) Appl. No.: 12/859,850

(22) Filed: Aug. 20, 2010

(65) Prior Publication Data

US 2011/0048566 A1    Mar. 3, 2011

Related U.S. Application Data

(60) Provisional application No. 61/236,599, filed on Aug. 25, 2009.

(51) Int. Cl.
*F16L 11/00*    (2006.01)

(52) U.S. Cl.
USPC ............................ 138/127; 138/124; 138/137

(58) Field of Classification Search
USPC .......................................... 138/124, 127, 137
See application file for complete search history.

(56) References Cited

U.S. PATENT DOCUMENTS

| | | | |
|---|---|---|---|
| 2,829,671 A * | 4/1958 | Ernst et al. ..................... | 285/245 |
| 3,062,241 A | 11/1962 | Brumbach | |
| 3,116,760 A | 1/1964 | Matthews | |
| 3,251,381 A | 5/1966 | Koch | |
| 3,310,447 A | 3/1967 | Matthews | |
| 3,684,602 A | 8/1972 | Ball | |
| 3,725,167 A | 4/1973 | Love et al. | |
| 3,988,188 A | 10/1976 | Johansen et al. | |
| 4,175,992 A | 11/1979 | Grawey | |
| 4,341,578 A | 7/1982 | Chermak et al. | |
| 4,444,700 A | 4/1984 | Fondren | |
| 4,447,378 A | 5/1984 | Gray et al. | |
| 4,559,095 A | 12/1985 | Babbin | |
| 4,585,035 A * | 4/1986 | Piccoli .......................... | 138/127 |
| 4,604,155 A | 8/1986 | McKiernan | |
| 4,668,318 A * | 5/1987 | Piccoli et al. ................. | 156/149 |
| 4,898,212 A | 2/1990 | Searfoss et al. | |
| 5,062,456 A | 11/1991 | Cooke et al. | |
| 5,145,628 A | 9/1992 | Karg et al. | |
| 5,380,571 A | 1/1995 | Ozawa et al. | |
| 5,660,210 A | 8/1997 | Ikeda et al. | |
| 5,964,409 A | 10/1999 | Alexander et al. | |

(Continued)

FOREIGN PATENT DOCUMENTS

| | | |
|---|---|---|
| AU | 448761 | 5/1974 |
| GB | 2165331 | 4/1986 |
| WO | 2009/040610 | 4/2009 |

OTHER PUBLICATIONS

Society of Automotive Engineers SAE J343, Test and Test Procedures for SAE 100R Series Hydraulic Hose and Hose Assemblies, Jan. 2004.

(Continued)

*Primary Examiner* — Paul R Durand
*Assistant Examiner* — Vishal Pancholi
(74) *Attorney, Agent, or Firm* — James C. Nemmers; Shuttleworth & Ingersoll, PLC

(57) ABSTRACT

A high pressure hose and method of manufacturing the hose is disclosed. The hose is comprised of an elastomer, thermoset rubber inner tube, reinforced with one or more layers of braided or spiralized high tensile strength wire or high tenacity textile yarn and covered with a highly flexible thermoplastic sheath.

9 Claims, 3 Drawing Sheets

(56) References Cited

U.S. PATENT DOCUMENTS

| | | | |
|---|---|---|---|
| 6,112,771 A * | 9/2000 | Aoyagi et al. | 138/127 |
| 6,170,532 B1 | 1/2001 | Campbell | |
| 6,230,751 B1 * | 5/2001 | Sjotun | 138/153 |
| 6,978,805 B2 * | 12/2005 | D'Amico | 138/125 |
| 7,222,644 B2 | 5/2007 | Pianetto et al. | |
| 2005/0087250 A1 * | 4/2005 | Ng et al. | 138/127 |
| 2008/0105283 A1 | 5/2008 | Pianetto et al. | |

OTHER PUBLICATIONS

Society of Automotive Engineers SAE J517, Hydraulic Hose, Nov. 2008.

European Search Report dated Apr. 27, 2012 from counterpart application.

* cited by examiner

HYBRID HIGH PRESSURE HOSE

This application claims priority under 35 USC 119 to Provisional Patent Application Ser. No. 61/236,599 filed on Aug. 25, 2009, the contents of which are hereby incorporated by reference.

FIELD OF THE INVENTION

The invention is an improved hose that relates to high pressure hoses used for hydraulic actuation, high pressure spray such as high pressure water cleaning and transfer of various liquid medium under high pressure.

BACKGROUND OF THE INVENTION

Traditionally, high pressure hoses have been made using the same materials for the inner tube and the outer cover. In other words elastomer or rubber hoses have been constructed using a rubber inner tube and a rubber cover. So called thermoplastic or plastic hoses have been constructed using a thermoplastic inner tube and a thermoplastic cover.

For purposes of the present invention described herein, it is important to provide the definitions of "rubber" and "plastic". As used herein the term "rubber" is synonymous with "elastomer" and refers to thermosetting, crosslinking, or curable materials, including natural and synthetic rubbers such as, but not limited to Neoprene®, nitrile, Buna N, styrenebutadiene rubber (SBR), Hypalon™, silicone and the like. Modern elastomeric materials are often devised of more than one rubber material and may contain other additives and/or be comprised of additional elements such as one or more thermoplastic constituent(s).

Elastomeric materials require a process of curing or vulcanization. Various methods of curing have evolved over the years and for the purposes of this invention, conventional methods known to those familiar with the art apply. One common method is curing in a steam autoclave. Elastomeric materials are also considered to be thermosetting, a term that means once cured, they will not return to a liquid state.

As used herein, the term "thermoplastic" means materials which are solid at room temperature and which soften at an elevated temperature repeatedly. Some examples, but by no means all that may apply to this invention, include thermoplastic materials such as nylon, polyester terephthalate, polyethylene, polyvinyl chloride, polyamide (nylon), ethylene vinyl acetate, polypropylene and polyurethane. Modern thermoplastic materials are often devised of more than one thermoplastic material and may contain other additives and/or be comprised of additional elements such as one or more elastomeric or rubber constituent(s).

As stated previously, modern polymers, whether thermoplastic or elastomeric, often contain constituents of the other. Thus, a material is considered elastomeric if it requires curing although it may contain a constituent or constituents of thermoplastic and/or other additives. Conversely, a thermoplastic material is still considered thermoplastic if it can achieve a liquid state at a certain high temperature, even if it includes a constituent or constituents of rubber and/or other additives. For purposes of the present invention, materials are considered thermoplastic or elastomeric if they retain the processing properties as defined herein, even if they contain components or constituents of the other.

Wire and textile reinforced elastomeric and thermoplastic hoses are ubiquitous. So much so that the Society of Automotive Engineers (SAE) has adopted detailed standards that describe the materials used in their construction, dimensional tolerances and the dynamic test parameters for a wide range of hoses. Such details are amply described in the standards SAE J343 (2004-01) and SAE J517 (2008-11). Virtually all high pressure hoses in use today are consistent with performance criteria and materials as described in SAE J517 and SAE J343 at least on a conceptual basis. Design differentiation is employed when a particular niche application places different demands on the hose. Such demands may require a higher technical level of performance or a lower level of performance. In addition to the definitive U.S. standards of SAE J343 and SAE J517, there are international standards, including (ISO) International Standards Organization, DIN (Deutsche Industrial Norms), BS (British Standards), EN (European Norm), and the like. All standards are basically similar and often cross reference one another. The methods of manufacturing the all-rubber and all-thermoplastic hoses are well known to those familiar with the art. Within the SAE J517 and SAE J343 documents there are described three main types of high pressure hydraulic hose: steel wire braided rubber; steel wire spiralized rubber and; yarn braided thermoplastic.

U.S. Pat. No. 3,725,167 and U.S. Pat. No. 4,604,155 teach various methods of making steel wire braided rubber high pressure hose Such hoses exhibit excellent flexibility, fitting retention, kink resistance and impulse life but are known not to be as good in terms of abrasion as hoses with engineered thermoplastic cover sheaths.

U.S. Pat. No. 4,175,992 teaches various methods of making steel wire spiralized rubber high pressure hose. Such hoses exhibit excellent very high pressure performance, fitting retention, kink resistance and impulse capabilities, but because they have as many as six layers of reinforcement are generally very stiff particularly on the larger sizes.

U.S. Pat. Nos. 3,251,381 and 3,116,760 teach various methods of making yarn reinforced thermoplastic high pressure hoses. Such hoses exhibit excellent high pressure performance, impulse life, and abrasion resistance, but are known to be prone to kinking and poor fitting retention problems at high temperatures particularly if the increase in temperature approaches the melt temperature of the material used in inner tube and cover sheath.

There exists a need to incorporate the best individual features of the three basic types of hose and therefore, in recent years, various efforts have been introduced to "hybridize" or impart features or methods that cross over from one or more of the three concepts described previously. Such attempts have only been marginally successful in niche applications and have often required one benefit to be sacrificed to gain another.

U.S. Pat. No. 4,341,578 teaches methods to use braided wire instead of yarn in the manufacture of thermoplastic hose. The result is improvement in fitting retention, but the hose itself remains very stiff. Such stiffness makes the hose acceptable for a permanent installation, but for practical purposes cannot be used as a spray hose.

In an effort to improve the known abrasion deficiencies of known rubber covered hoses, U.S. Pat. No. 5,145,628 teaches a method whereby an ultra high molecular weight polyethylene (UHMWPE) is applied by wrapping a tape of same over an extruded sheath covering wire braided or spiralized rubber hose. UHMWPE is known to be very expensive even though it has superior abrasion resistance, which in some applications is desirable. While UHMWPE is a thermoplastic material, the process requires the thermoplastic cover sheath to be applied over an extruded rubber sheath and then vulcanized.

U.S. Pat. No. 5,964,409 teaches a yarn reinforced thermoplastic hose for high pressure spraying whereby the inner tube and cover are produced with highly plasticized thermoplastic materials free of a rubber constituent. The result is an inexpensive hose, but the impulse life and temperature resistance are dramatically below those described in SAE J343 and SAE J517. The hose shows some improvement in flexibility, but is still relatively stiff, prone to kinking, has a low temperature rating and is generally poor in terms of fitting retention. Such a hose is acceptable for light duty spray applications, but would not be acceptable for hydraulic applications because of limits in temperature and impulse life which are well below those noted in SAE J343 and SAE J517.

U.S. Pat. No. 7,222,644 teaches a steel wire reinforced thermoplastic hose for high pressure spraying whereby the inner tube and cover are produced with highly plasticized thermoplastic materials. The result is a hose that is still very stiff although fitting retention is better than a textile yarn reinforced version. Again, such a hose may be acceptable for light duty spray applications, but would not be acceptable for hydraulic applications because of limits in temperature and impulse life which are well below those noted in SAE J343 and SAE J517.

It is generally known to those familiar with the art that wire braided high pressure rubber hoses are substantially more flexible and less prone to kinking than their thermoplastic counterparts with the same performance specifications as described within SAE J343 and SAE J517. For example, the performance specifications for SAE100R18 yarn reinforced thermoplastic hose are exactly the same as for SAE100R17 wire braided rubber hose. Yet, the rubber hose is nearly impossible to kink and remains highly flexible. U.S. Pat. No. 7,222,644 describes thermoplastic hoses with a bend radius as small as 30 mm. An equivalent wire braided all rubber hose will not kink, for example, in a nominal ¼", 5/16" and ⅜" (nominal inside diameter dimensions defined by SAE) size even below 30 mm if the method for measuring the bend radius described in this '644 patent is used.

On the other hand, thermoplastic hoses are known to be far superior in terms of abrasion, ozone and ultraviolet light resistance by comparison to natural and synthetic rubber compounds. An ideal hose would exhibit the known flexibility of a reinforced rubber hose, combined with a highly flexible, resilient thermoplastic cover.

There is therefore a need for an improved high pressure hose that meets the requirements of all relevant standards while combining the most desirable qualities of both all-elastomeric and all-thermoplastic hoses and which can be produced at a reasonable cost.

DESCRIPTION OF THE PREFERRED EMBODIMENTS OF THE INVENTION

Figure 1:
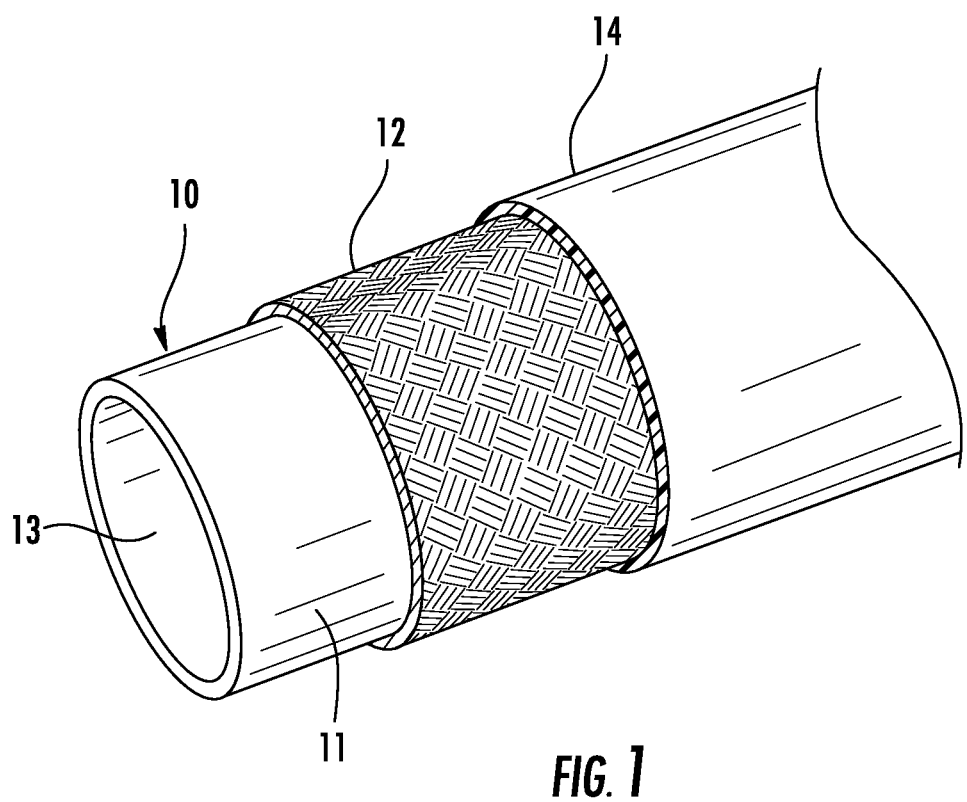
FIG. 1 is a perspective view of a portion of a hose constructed according to the principles of the invention, with layers partially cut away for purposes of illustration.

The present invention bridges the gap between elastomeric and thermoplastic high pressure hoses. Referring first to FIG. 1, a first embodiment of the invention is illustrated in which a hose is comprised of an inner rubber tube 10 made of an elastomeric or rubber, such as nitrile rubber. Tube 10 has an outer surface 11 and a passageway 13 through which a fluid under pressure can flow. The hose also has one or more braided or spiralized reinforcing layers 12 of textile yarn or wire covering the outer surface of the inner tube 10, and a protective thermoplastic sheath 14 covering the reinforcing layer 12.

To produce the hose of this first embodiment, the inner tube 10 with the rubber in an uncured state is extruded over a solid steel mandrel or flexible polymeric mandrel (not shown). The tube 10 is then passed through a braiding machine (not shown) where high tensile strength wire is braided onto the outer surface of the tube 10 to form the reinforcing layer 12. Such extrusion and braiding machines are well known, and the size and type of wire and method of applying the braid to meet the desired dynamic requirements of the hose are also well known. A temporary thermoplastic sheath (typically Polypropylene or other suitable material) is then applied over the outside of the reinforced uncured rubber tube 10. The uncured partially completed hose is then placed in a suitable autoclave where through a time controlled exposure to steam pressure, the hose is cured or vulcanized. Such curing will create a bond between the wire braided reinforcing layer 12 and the outside surface 11 of the inner tube 10. Additionally, as a byproduct of vulcanization, some of the material from the outside surface 11 of the inner tube 10 may ooze or extrude between the voids of the braiding and the braid intersections. A small amount of material may pass through the reinforcing layer and deposit itself on the outside of the tube. This is a preferred effect. After curing, the temporary polypropylene cover is removed preferably by means of a slitting and peeling process, and simultaneously or separately, a flexible thermoplastic polyurethane cover 14 is extruded directly onto the exposed steel wire braided surface of the reinforcing layer 12. After this step, the mandrel is removed by pressurized blow out and the hose is finished. Such a hose will meet all dimensional, performance and dynamic requirements of SAE J343 and SAE J517 for all types and sizes of one wire reinforced rubber hoses described in these standards. The hose of the invention will exhibit the desirable characteristics of rubber hose and all the desirable advantages of a thermoplastic cover.

Figure 2:
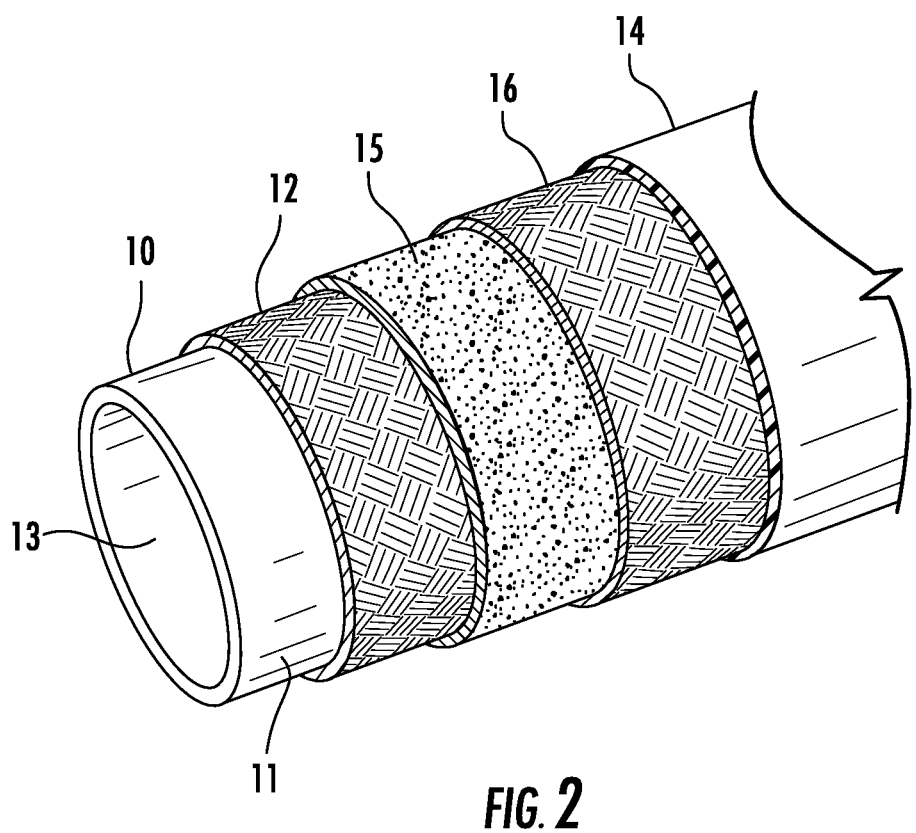
FIG. 2 is a perspective view of another embodiment of a hose constructed according to the principles of the invention, with layers partially cut away for purposes of illustration.

FIG. 2 illustrates the construction of a hose according to the principles of the invention in which two reinforcing layers are utilized. As in the previously described method for the hose of FIG. 1, the inner tube 10 with the rubber in an uncured state is extruded over a solid steel mandrel or flexible polymeric mandrel. The tube 10 is then passed through a braiding machine where high tensile strength wire is braided onto the outer surface of the tube 10 to form the first reinforcing layer 12. After the first reinforcing layer 12 is applied, a thin elastomeric layer is applied 15 which is then overlaid with a second reinforcing layer 16 of high tensile strength wire. The second reinforcing layer 16 is spirally applied at an angle generally in an angular direction opposite to the first reinforcing layer 12. The thin elastomeric layer 15 is often referred to as a tie layer, one purpose of which is to prevent the two reinforcing layers 12 and 16 from abrading against each other which can be detrimental to the hose service life. A temporary thermoplastic sheath (typically Polypropylene or other suitable material) is then applied over the outside of the double reinforced uncured rubber tube 10. The uncured partially completed hose is then placed in a suitable autoclave where through a time controlled exposure to steam pressure, the hose is cured or vulcanized. Such curing will create a bond between the wire braided reinforcing layers 12 and 16 and the outside surface 11 of the inner tube 10 and the tie layer 15.

After curing, the temporary polypropylene cover is removed preferably by means of a slitting and peeling process, and simultaneously or separately, a flexible thermoplastic polyurethane cover 14 is extruded directly onto the exposed steel wire braided surface of the reinforcing layer 16. After this step, the mandrel is removed by pressurized blow out and the hose is finished. Such a hose will meet all dimensional, performance and dynamic requirements of SAE J343 and SAE J517 for all types and sizes of two layer wire reinforced rubber hoses described in these standards. The hose of the invention will exhibit the desirable characteristics of rubber hose and all the desirable advantages of a thermoplastic cover.

Figure 3:
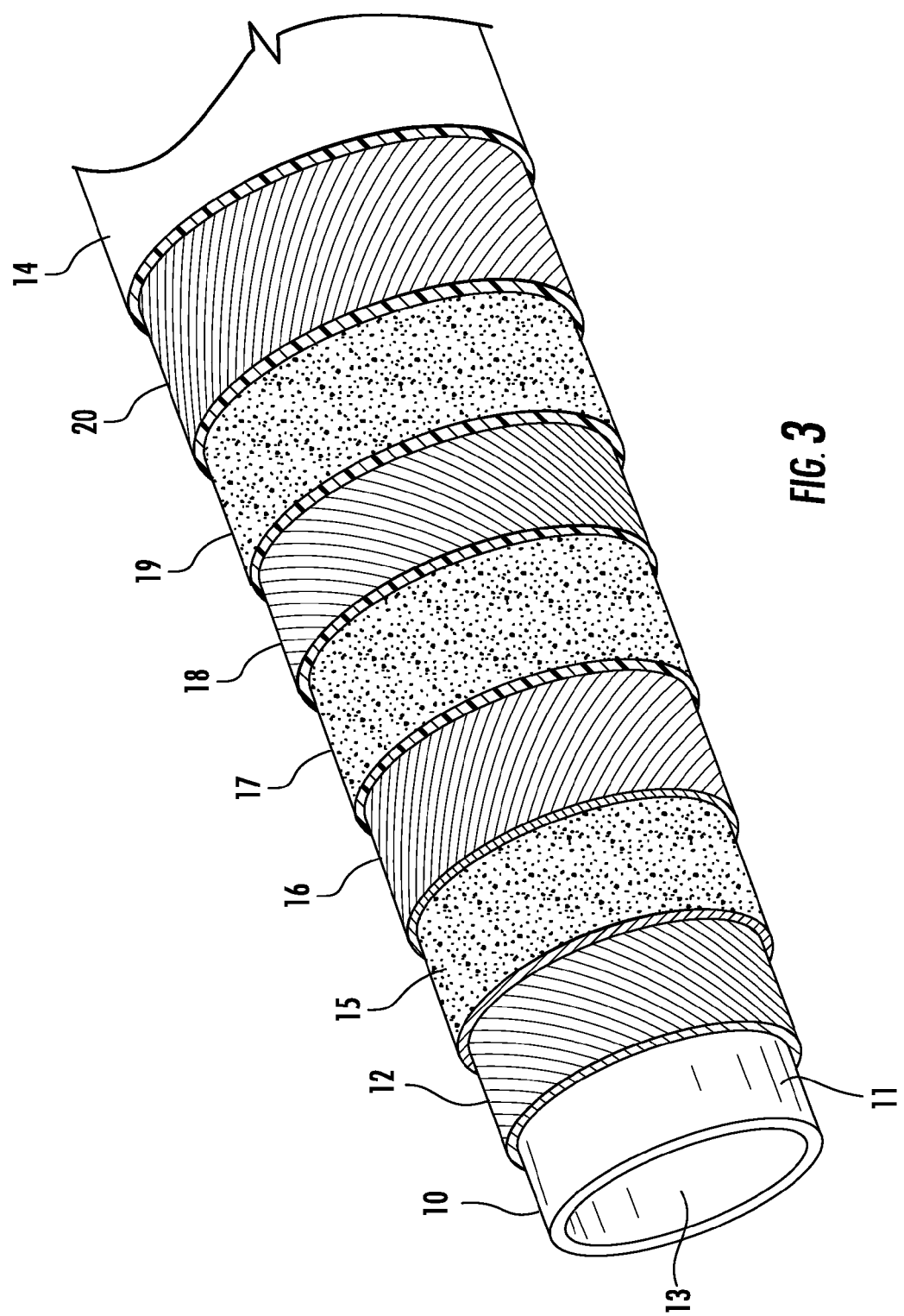
FIG. 3 is a perspective view of yet another embodiment of a hose constructed according to the principles of the invention, with layers partially cut away for purposes of illustration.

FIG. 3 illustrates the construction of a hose according to the principles of the invention in which multiple reinforcing layers are utilized. As in the previously described methods for the hose of FIGS. 1 and 2, the inner tube 10 with the rubber in an uncured state is extruded over a solid steel mandrel or flexible polymeric mandrel. The tube 10 is then passed through a braiding machine where high tensile strength wire is braided onto the outer surface of the tube 10 to form the first reinforcing layer 12. After the first reinforcing layer 12 is applied, a thin elastomeric layer is applied 15 which is then overlaid with a second reinforcing layer 16 of high tensile strength wire. The second reinforcing layer 16 is spirally applied at an angle generally in an angular direction opposite to the first reinforcing layer 12. As previously mentioned, the thin elastomeric layer 15 is often referred to as a tie layer, one purpose of which is to prevent the two reinforcing layers 12 and 16 from abrading against each other which can be detrimental to the hose service life. Then, another tie layer 17 is applied followed by another spirally applied reinforcing layer 18 of high tensile strength wire, again in the opposite angular direction as the preceding reinforcing layer 16. This is followed by another tie layer 19 and another spirally applied layer 20 of high tensile strength wire, again wound in an angular direction opposite to the wire of the preceding reinforcing layer 18. A temporary thermoplastic sheath (typically Polypropylene or other suitable material) is then applied over the outside of the multiple reinforced uncured rubber tube 10. The uncured partially completed hose is then placed in a suitable autoclave where through a time controlled exposure to steam pressure, the hose is cured or vulcanized. Such curing will create a bond between the wire braided reinforcing layers 12, 16, 18 and 20 and the outside surface 11 of the inner tube 10 and the tie layers 15, 17 and 19. After curing, the temporary polypropylene cover is removed preferably by means of a slitting and peeling process, and simultaneously or separately, a flexible thermoplastic polyurethane cover 14 is extruded directly onto the exposed steel wire braided surface of the last reinforcing layer 20. After this step, the mandrel is removed by pressurized blow out and the hose is finished. Such a hose will meet all dimensional, performance and dynamic requirements of SAE J343 and SAE J517 for all types and sizes of wire reinforced multiple layer spiral rubber hoses described in these standards. The hose of the invention will exhibit the desirable characteristics of rubber hose and all the desirable advantages of a thermoplastic cover.

In all of the foregoing methods described for the hoses illustrated in FIGS. 1, 2 and 3, the described steps may be done in the sequence described, a different sequence or may be accomplished in a continuous process. And each of the hoses can also be produced by practicing the basic steps of the following method, which is described with reference to the hose of FIG. 1, which has a single reinforcing layer. This method is performed by extruding the inner tube layer 10 of rubber and then passing the tube through a conventional continuous cure process without using a mandrel. Such methods are known to those familiar with the art and may utilize microwave or infrared or some other means of curing technology. After curing, the inner tube 10 is braided by conventional means using wire and/or textile yarn to form the reinforcing layer 12. Simultaneously, while the inner tube 10 is being braided, an adhesive is applied to the outside surface 11 of the tube 10 between the tube and braided material while internal pressure is applied to the internal passageway 13 of the tube 10 so as to create an adhesive bond between the tube 10 and the reinforcing layer 12 of braided material. Adhesives for such an application are known and may contain polyurethane solids suspended in a solvent or may be close or open celled foaming type. Said adhesive may ooze, flow or otherwise extrude into voids or intersections within and through the reinforcement braiding and a small amount may deposit itself on the outside of the inner tube 11. This is the preferred effect. After the adhesive cures, the cured braided tube is passed through a conventional extruder where a cover sheath or layer 14 of thermoplastic polyurethane is applied to complete the hose. This embodiment of the hose of the invention will meet all dimensional, performance and dynamic requirements of SAE J343 and SAE J517 for all types and sizes of wire braided rubber hoses described in these standards. The hose will also exhibit all the desirable characteristics of rubber hose and all the desirable advantages of hoses with a thermoplastic cover.

In yet another embodiment, the hybrid hoses of the invention shown in FIGS. 1 and 2 can be formed by extruding a rubber inner tube 10 and passing it through a conventional continuous cure process without a mandrel in the same way as the preceding embodiment. In this embodiment, however, no adhesive is applied and the reinforcing layer 12 is completed by conventional means through braiding yarn or steel directly onto the outer surface 11 of the inner tube 10. It may be necessary to freeze, chill or otherwise stiffen or support the tube 10 with internal pressure so as to prevent collapse due to the tension required as part of the braiding process. To complete the hose of this embodiment, a cover sheath 14 of thermoplastic is applied by a continuous extrusion process. The hose of this embodiment will meet all dimensional and dynamic requirements of SAE J343 and SAE J517 for all types and sizes of wire braided rubber hoses described therein, except there will be a reduction in the maximum impulse. This is because the bond between the inner tube and the reinforcement braid will result in abrasion between the plies of the reinforcement layer or layers during the impulse test. In various light duty (low impulse) or high pressure spray applications, such performance would be considered acceptable. Such a trade off can be considered acceptable in a static application where there is no impulse and or in a high pressure spray application where the impulse frequency is substantially below those described in SAE J343 and SAE J517.

In one test applying the principles of the invention, a nominal 5/16"(nominal inside diameter as per SAE) rubber tube was extruded onto a solid rubber mandrel, after which a wire braiding was applied by conventional means. These methods of forming the tube and applying the braiding are consistent with the process to manufacture SAE100R1 hose as specified in SAEJ517. The reinforced tube was wrapped spirally with a nylon tape and then placed in an autoclave at high temperature in order to vulcanize the hose. After vulcanization, the solid rubber mandrel was removed and a Polyurethane cover sheath was extruded onto the cured reinforced tube. This hose exhibited all the characteristics called out in SAEJ343 for testing, including: dimensional check test, proof test, change in length test, burst test, cold bend test, impulse test, leakage test, oil resistance test, ozone resistance test, resistance to vacuum test and volumetric expansion test.

As stated previously, a steel reinforced rubber hose is virtually impossible to kink, yet remains highly flexible. It is important to note that the prior art teaches two methods for measuring bend radius to determine flexibility. The scope of the SAE J343 standard is to establish a minimum bend radius, measured with the hose installed and in service, below which bend radius a reduced service life is expected. U.S. Pat. Nos. 7,222,644 and 5,964,409 (the '644 and '409 patents) teach methods of measuring minimum bend radius while the hose is not in service, but rather in an unfilled, ambient pressure state, and as so defined, minimum bend radius is the smallest radius before kinking. To those familiar with the art, the SAE specification is often referred to as a "dynamic" bend radius, whereas the bend radius taught in the '644 and '409 patents would be considered a "mechanical" bend radius. In any event, the hose of the present invention meets or exceeds dynamic bend radius definitions described in both SAE standards J517 and J343 and allows for a smaller mechanical bend radius than those described in the U.S. Pat. Nos. 5,964,409 and 7,222,644.

A hose produced according to the principles of the invention as described herein, when measured in accordance with the procedures disclosed in the U.S. Pat. Nos. 5,964,409 and 7,222,644, exhibited a bend radius of 30 mm. Such results were expected as the hybrid hose of the present invention retains all the same basic properties of an equivalent rubber hose and is only limited by the hardness of the thermoplastic sheath material applied during the last step. A hose constructed according to the principles of the invention would be considered an acceptable product for high impulse applications such as hydraulic actuation and high pressure cleaning as well as a variety of other high pressure applications. For high pressure cleaning, the hose of the invention has an additional feature in that the polyurethane cover is substantially non-marking. One common complaint for the high pressure cleaning application is that a hose with a black rubber cover will transfer rubber material to the surface, such as a driveway, swimming pool, deck or parking lot much like a spinning tire can leave a virtually permanent black mark on a street. It is well known that rubber hose producers make hoses with colored rubber compounds to offset this phenomenon. However, it is also known that such colors serve to reduce the obviousness of mark left by the rubber transfer, but does not eliminate it. A hose covered with thermoplastic, e.g., polyurethane, requires substantially more friction before it will leave a mark, if at all, and said mark would be easily removed.

Hoses currently available in the market for high pressure cleaners use materials similar to those used in hydraulic hoses. That is to say, the prior art teaches either a thermoplastic tube with an extruded thermoplastic cover or a rubber hose with an extruded rubber cover. The hose of the present invention combines the advantages of both. The '644 and '409 patents both teach the use of Santoprene® a product of the Dupont Company, a TPE material made by DuPont. This material exhibits many of the properties of rubber, including high temperature capabilities, and Santoprene® is rated for service of 275° Fahrenheit. However, Santoprene® is extremely expensive and although it exhibits many characteristics of rubber, it remains a thermoplastic material, meaning it has a specified melt point of about 350° Fahrenheit. Therefore, because of the expense and the temperature limitation, use of Santoprene® in hoses is limited, and it is not suitable for many high pressure cleaning applications where hot water or steam applications are prevalent and thus temperatures may exceed 350° degrees Fahrenheit. In such applications, an all Santoprene® construction would fail catastrophically if exposed to temperatures between 275° Fahrenheit and 350° Fahrenheit.

Another advantage of the present invention is that with the stability of a high temperature resistant rubber tube, even if the thermoplastic cover used has a low melt point, such melting will not result in a catastrophic failure with the potential to cause serious injury. This is because the cover will simply melt, while the rubber inner tube and reinforcement will stay intact. Thus, a definite advantage of the hose of the present invention is that it is inherently more safe than a reinforced hose with a thermoplastic inner tube and thermoplastic cover sheath. An intended or designed specific melt point of thermoplastic material used for the cover can further be incorporated as an obvious signal that a hose has been exposed to a temperature higher than the melt point. Such melting does not represent a hazard.

As explained in detail above, the present invention does not require an extruded rubber sheath before the thermoplastic cover is applied, which prior art methods and hoses require. Secondly, the present invention teaches extrusion of the thermoplastic cover rather than wrapping a pre-extruded strip around the circumference of the hose. Further, the present invention teaches the extrusion of the thermoplastic cover as a last and separate step and is accomplished after the wire reinforced rubber tube is vulcanized. Lastly, the present invention does not require the bonding of the thermoplastic to the substrate, whether rubber or wire reinforcement.

As mentioned previously, the principal object of this invention is to combine the most desirable features and benefits of both conventional rubber and thermoplastic high pressure hoses. The methods of the present invention results in a novel hose that is virtually impossible to kink yet remains as highly flexible as if it were entirely produced of rubber. The hose has superior abrasion, ozone and U.V. resistance over conventional rubber hoses because the cover is produced of thermoplastic. In addition, as a spray hose, the cover will not leave undesirable marks as it is dragged about the surface and the hose will demonstrate much better chemical resistance and resistance to oils and fats, especially animal fats prevalent in some high pressure cleaning environments. The hose maintains high temperature capabilities because the rubber inner tube will not melt when using a stabile thermoplastic cover. If desired, the hose can also be designed with a specific melt point for the cover that will indicate if the hose has been exposed to a temperature higher than the designated service temperature.

There are other advantages to the already disclosed technical advantages of the hose of the invention. While prior art hoses establish the use of a thermoplastic cover, as in U.S. Pat. No. 5,145,628 regarding the UHMWPE cover, such teaching describes a material that is very expensive and is bonded to an extruded rubber cover and then passed through the vulcanization curing process. The present invention does not require the thermoplastic cover to be necessarily bonded to the outside of the wire reinforcement layer, and if such bonding is desired, it can be accomplished through chemical adhesive means. Moreover, the present invention does not require that the thermoplastic cover be cured or vulcanized as part of a finished hose. Thermoplastic materials are generally easier to extrude than thermosetting rubber materials. Thus, if the hose is manufactured and cured without a cover, as taught by the present invention, the covering step can be accomplished as a last step. This allows a single hose carcass (a reinforced, cured rubber tube) to be covered using a wide range of options. From a manufacturing perspective, this offers the flexibility of using different materials depending upon a specific use in a wide range of hose applications. Therefore, the hose of the present invention does not require the thermoplastic cover sheathing to withstand the very high temperatures that are encountered during the vulcanization process which temperatures sometimes exceed 300° Fahrenheit).

The basic principles of the invention can be applied to produce hoses with other foreseen advantages, depending upon the particular use for which the hose is designed. For example, a hose may be required to use a thermoplastic material capable of withstanding high temperatures. Another thermoplastic cover material may be selected on the basis of high abrasion resistance. Yet another may be selected using a different color or multiple colors. This allows a great degree of flexibility in terms of design specificity that has not existed within the known prior art.

While the specifications and test procedures described in SAEJ343 and SAE J517 remain the definitive parameters for high pressure hose, variations in performance are anticipated. The reference to SAEJ 343 and SAE J517 does not attempt in any way to limit the invention to hoses and hose types defined therein. In contrast, the novelty of the present invention has appeal for a wide range of high pressure hoses used in a wide variety of applications. Such variations may improve upon the basis of the descriptions described therein. Other variations may reduce the performance dynamic to a level below for one or more of the criteria described therein.

The present invention is not limited by the embodiments or examples described herein. The terms and expressions which have been used are used as terms of description and not of limitation and there is no intention in the use of such terms and expressions of excluding any equivalents of any of the features described, or portions thereof, but it is recognized that various modifications are possible within the scope of the invention, which is defined by the following claims.

What is claimed is as follows:

1. A high pressure hose comprising:
   an inner tube comprised of a thermosetting, vulcanized material that is an elastomeric material and having an outer surface and an inner surface that defines a fluid-carrying passageway;
   a reinforcing layer of braided reinforcing material applied to the outer surface of the inner tube, the braided reinforcing material having voids with material from the outer surface of the inner tube filling the voids; and
   an outer sheath of a flexible thermoplastic material which contains elastomeric properties applied to the reinforcing layer.

2. The high pressure hose of claim 1, wherein the inner tube is comprised substantially of an elastomeric material but contains elements of one or more thermoplastic materials.

3. The high pressure hose of claim 1 in which the passageway has a nominal diameter between about ¼" and about ⅜" and the hose has a minimum mechanical bend radius no greater than about 30 mm.

4. The high pressure hose of claim 1 in which the reinforcing layer is a braided wire.

5. The high pressure hose of claim 1 in which the reinforcing layer is at least one layer of braided yarn.

6. The high pressure hose of claim 4 in which the passageway has a nominal diameter between about ¼" and about ⅜" and the hose has a minimum mechanical bend radius no greater than about 30 mm.

7. The high pressure hose of claim 5 in which the passageway has a nominal diameter between about ¼" and about ⅜" and the hose has a minimum mechanical bend radius no greater than about 30 mm.

8. The high pressure hose of claim 1 further comprising a thin tie layer of elastomeric material covering the reinforcing layer which is a first reinforcing layer; and
   a second reinforcing layer covering the tie layer of elastomeric material, the outer sheath of a thermoplastic material covering the second reinforcing layer.

9. The high pressure hose of claim 6 in which the first and second reinforcing layers are braided wire, and the wires of the first and second reinforcing layers are spirally applied, the wire of the second reinforcing layer being applied at an angle generally in an angular direction opposite to the wire of the first reinforcing layer.

\* \* \* \* \*